Nov. 24, 1942.  D. F. WARNER  2,302,822
LUBRICATING SYSTEM
Filed May 9, 1941
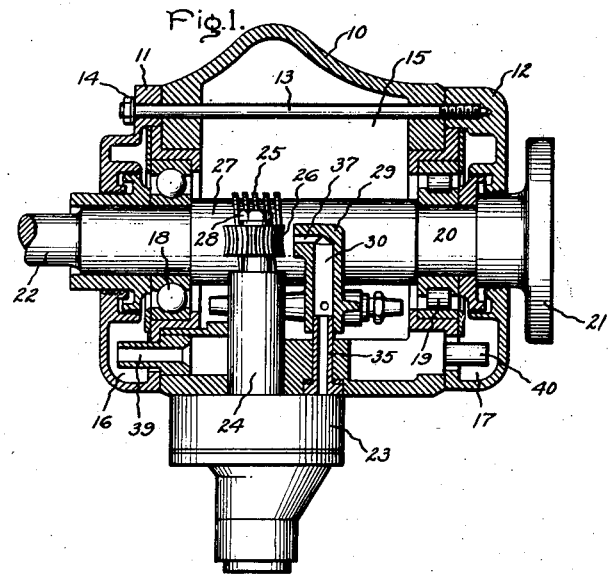
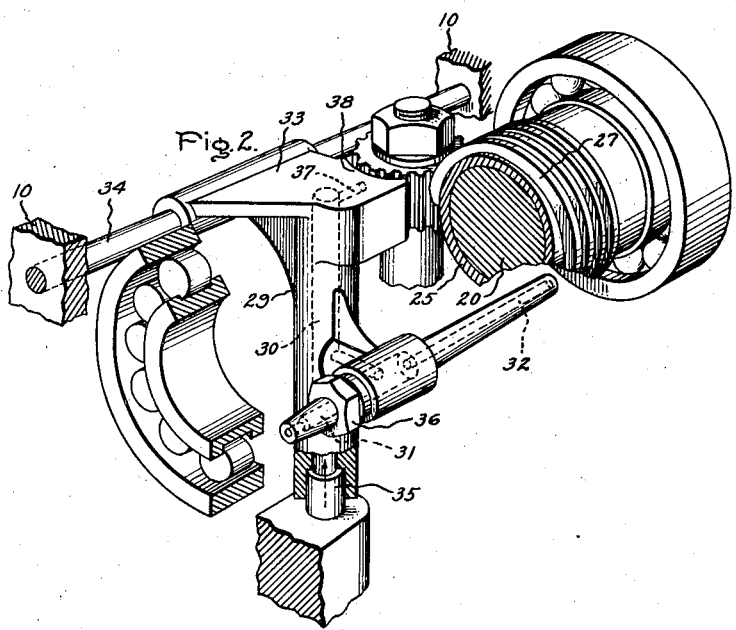
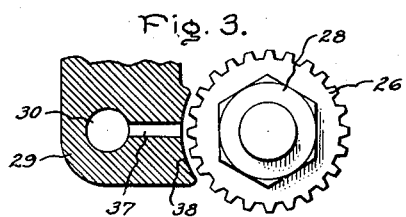
Inventor:
Donald F. Warner,
by Harry E. Dunham
His Attorney.

Patented Nov. 24, 1942

2,302,822

UNITED STATES PATENT OFFICE 2,302,822

LUBRICATING SYSTEM

Donald F. Warner, Swampscott, Mass., assignor to General Electric Company, a corporation of New York Application May 9, 1941, Serial No. 392,639

6 Claims. (Cl. 184—6)

The present invention relates to lubricating systems for supplying oil or like lubricant to bearings, gears, and other elements requiring lubricant during operation. The invention is of particular significance in connection with lubricating systems including means for conducting lubricant to gears used on and forming part of turbosuperchargers for aircraft. Difficulties have heretofore been experienced in aircraft due to the increase in viscosity of the lubricant at high altitude because lubricant discharged from a tube or jet due to its high viscosity may fail to reach the gear or like element to which it is to be discharged.

The object of my invention is to provide an improved construction and arrangement of lubricating systems whereby bearings, gears and other elements may be effectively lubricated during operation at varying temperatures and altitudes.

A specific object of my invention is to provide an improved construction and arrangement for lubricating worm gears subject to operation at varying temperatures and located in and considerably spaced from the walls of a housing.

For a consideration of further objects of my invention and of what I believe to be novel and my invention, attention is directed to the following description and the claims appended thereto in connection with the accompanying drawing.

In the drawing Fig. 1 illustrates a combined bearing and gearing arrangement in accordance with my invention; Fig. 2 is an enlarged perspective view partly broken away of the arrangement in Fig. 1; and Fig. 3 is a top view partly in section of certain elements of Fig. 2.

The arrangement shown in the drawing comprises a casing or housing 10 with end covers 11 and 12 fastened to the housing 10 by means of a plurality of stay bolts 13 projecting through openings in the housing 10 and each having an end threaded into the cover 12 and another end securing the cover 11 to the housing 10 by a nut 14. The housing 10 with the covers 11 and 12 forms a central chamber 15 and end chambers 16 and 17 respectively. A ball bearing 18 is supported on the left-hand portion of the housing 10 between the chambers 15 and 16 and another antifriction bearing more specifically a roller bearing 19 is supported on the right end portion of the housing 10 between the chambers 15 and 17. The two bearings 18 and 19 form a support for a shaft 20 which has a right-hand flanged end portion 21 overhung from the cover 12 and a left-hand end portion 22 overhung from the cover 11 of the housing 10. When used in conjunction with and as part of turbosuperchargers, the flanged overhung portion 21 is connected to and forms a support for a bucket wheel and the overhung shaft portion 22 is secured to and serves as a support for an impeller wheel (not shown).

The arrangement includes a system for conducting lubricant to the bearings 18 and 19 and for the removing lubricant discharged from said bearings into the chambers 15, 16 and 17. The lubricating system comprises pumping means 23 supported on the housing 10 and including a rotatable element or elements connected to a shaft 24 from the main shaft 20 through a worm gear having a worm 25 and a gear 26. The worm 25 forms part of a sleeve 27 suitably secured to the shaft 20 and held between the inner races of the bearings 18 and 19. The gear 26 is secured to an upper reduced end portion of the shaft 24 by means of a nut 28.

The worm gear 25, 26 which constitutes a means for driving the pumping means 23 from the main shaft 20 also requires lubricant during operation.

The means for conducting lubricant discharged from the pumping means 23 to the bearings 18, 19 and to the worm gear 25, 26 in accordance with my invention comprises a lubricant distributer 29 which has three conduits 30, 31 and 32 for conducting lubricant to the worm gear 25, 26, the bearing 18 and the bearing 19 respectively. The conduit 30 extends substantially transverse to the aligned conduits 31, 32 and has an upper portion forming a bracket 33 pivotally held on an intermediate portion of a rod or like supporting member 34. The rod 34 may be formed by one of the stay bolts 13.

Means are provided to prevent the lubricant distributer 29 from translatory movement along the rod 34 and also from rotatary movement about the rod 34. In a preferred embodiment of my invention this means comprises a supply tube or nozzle member 35 rigidly held in a bore of the housing 10 and telescoping into the lower end of the conduit 30.

During assembly the lubricant distributer 29 may first be assembled with the rod 34 and thereafter the nozzle member or supply tube 35 may be inserted through the housing 10 into the lower end of the conduit 30.

The conduits 30, 32 and the bracket 33 may be manufactured in a single piece and the conduit 31 may be connected and secured to the left-hand end of the conduit 32 by means including a nut 36. The conduit 30 has an upper portion forming a channel 37 for discharging lubricant towards the gear 26. The end of the channel 37 adjacent to the gear 26 is spaced from the latter. In order to assure continuous positive supply of lubricant from the channel 37 to the surface of the gear 26 or from another viewpoint to prevent lubricant discharged from the channel 37 from dropping into the chamber 15 without coming into contact with the gear 26, a shroud 38 is provided adjacent the outlet of the channel 37. In the present example a shroud 38 is formed by a portion of the conduit 30 and the bracket 33. The surface of the shroud 38 is cylindrical and closely spaced and concentric with the gear 26, extending over about 60 angular degrees of the gear.

During operation lubricant forced by the pumping means 23 into the supply tube 35 is conducted through the conduits 30, 31 and 32 of the distributer 29 to the bearing 18, the bearing 19 and the worm gear 25, 26 respectively.

Lubricant discharged from the worm gear is collected in the chamber 15 and lubricant discharged from the bearings 18, 19 is collected in the chamber 15 and in the chambers 16 and 17.

The pumping means 23 includes a pump for scavenging the chambers, that is, for removing lubricant therefrom and returning it to the source of supply. In order to assure thorough scavenging of the chambers 16 and 17 a conduit 39 is provided for connecting the left-hand end of the chamber 16 to the chamber 15 and another conduit 40 is provided for connecting the right-hand end of the chamber 17 to the chamber 15. These conduits assure substantial removal of lubricant from the chambers during varying angular positions the arrangement may assume when operated on aircraft. Thus in the position shown with the shaft 20 horizontal lubricant is conducted from the chambers 16 and 17 through the conduits 39 and 40 respectively into the central or main chamber 15 whence it flows into the inlet of a scavenging pump not shown in detail because it does not form a part of the present invention. During operation with the shaft in inclined position with the flanged overhung portion 21 located at a level above that of the left-hand overhung portion 22 the lubricant in the chamber 17 flows by gravity into the chamber 15 and the lubricant contained in the chamber 16 and the chamber 15 is removed therefrom by the suction of the scavenging pump.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. The combination of a housing with removable end covers, a main shaft projecting through openings in the housing, bearing means supporting the shaft on the housing, and a lubricating system for conducting lubricant to the bearing means, said lubricating system comprising pump means, means for driving the pump means including an auxiliary shaft, a gear secured to the auxiliary shaft, a worm secured to the main shaft and meshing with the gear for driving the auxiliary shaft from the main shaft, a lubricant distributer forming conduits for conducting lubricant from the pump means to the bearing means and to the gear, means including a pivot supporting the distributer on the housing, and a lubricant supply conduit secured to the housing and telescoping one of the conduits to conduct lubricant from the pump means to the distributer and to limit movement of the distributer.

2. The combination of a housing, spaced bearings supported on the housing, a shaft having spaced portions supported on the bearings, and a lubricating system for conducting lubricant to the bearings, said system including a pump having a shaft, a worm gear for driving the last named shaft from the first named shaft, and conduit means for conducting lubricant from the pump means to the bearings and to the worm gear including a tube secured to the housing and a distributer forming a channel telescoping the tube and means pivotally supporting the distributer on the casing and constituting a pivot upon removal of the tube.

3. The combination of a housing, spaced bearings supported on the housing, a shaft having spaced portions supported on the bearings, and a lubricating system for conducting lubricant to the bearings, said system including a pump having a shaft, a worm gear for driving the last named shaft from the first named shaft, and conduit means for conducting lubricant from the pump to the bearings including a tube secured to the housing and a distributer forming a channel telescoping the tube and means supporting the distributer on the casing, the distributer forming another channel for conducting lubricant to the worm gear and a shroud surrounding the discharge end of said other channel in close proximity to the worm gear in order to assure positive lubrication of the latter during high viscosity conditions of the lubricant.

4. The combination of a housing, bearing means supported on the housing, a main shaft supported on the bearing means, a lubricating system for supplying lubricant to the bearing means, said system including pumping means supported on the housing, means including an auxiliary shaft connected to the pumping means and a worm gear having a worm secured to the main shaft and a gear secured to the auxiliary shaft for driving the auxiliary shaft from the main shaft, a tube secured to the housing and connected to receive lubricant discharged from the pumping means, and a distributer having a plurality of channels including one channel telescoping the tube and other channels for conducting lubricant from the first mentioned channel to the bearings, one of the channels being arranged to conduct lubricant to the worm gear, the distributer at the discharge end of the last mentioned channel forming a shroud closely spaced with the worm to assure positive supply of lubricant thereto during varying viscosity conditions of the lubricant.

5. The combination of a housing, a worm gear disposed within and considerably spaced from the walls of the housing, and means for conducting lubricant to the gear comprising a distributer forming a channel, a pivot supporting the distributer on the housing and a tube fastened to the housing and projecting into the channel and preventing turning movement of the distributor about the pivot, the distributer forming a shroud closely spaced with and extending over about 60 angular degrees of the gear adjacent the discharge end of the channel to cause the lubricant discharge from the channel to come into contact with the gear irrespective of the viscosity of the lubricant and the angular position of the shaft.

6. A distributer for conducting lubricant to a gear comprising a conduit having an inlet and a discharge end, a curved shroud integrally formed with the conduit adjacent the discharge end for cooperation with such gear or like element to be lubricated to force the lubricant into contact with such gear or element during high viscosity conditions of the lubricant and in varying angular positions of the distributer, and a hinge integrally formed with and acting as a support for the conduit.

DONALD F. WARNER.